United States Patent
Barr

(10) Patent No.: US 10,131,325 B2
(45) Date of Patent: Nov. 20, 2018

(54) ENHANCED WIPER ASSEMBLY

(71) Applicant: FORD GLOBAL TECHNOLOGIES, LLC, Dearborn, MI (US)

(72) Inventor: William Gerald Barr, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/071,848

(22) Filed: Mar. 16, 2016

(65) Prior Publication Data

US 2016/0272160 A1 Sep. 22, 2016

(30) Foreign Application Priority Data

Mar. 18, 2015 (GB) .................................. 1504588.3

(51) Int. Cl.
  *B60S 1/38* (2006.01)
  *B60S 1/08* (2006.01)
  *B60S 1/54* (2006.01)

(52) U.S. Cl.
  CPC ............... *B60S 1/38* (2013.01); *B60S 1/0818* (2013.01); *B60S 1/546* (2013.01); *B60S 2001/3837* (2013.01)

(58) Field of Classification Search
  None
  See application file for complete search history.

(56) References Cited

U.S. PATENT DOCUMENTS

| | | | |
|---|---|---|---|
| 3,371,368 A | 3/1968 | Walker | |
| 3,825,966 A | 7/1974 | Hall | |
| 5,383,247 A | 1/1995 | Nickel | |
| 7,007,340 B1 | 3/2006 | James | |
| 2003/0208873 A1 | 11/2003 | Chang | |
| 2012/0211426 A1* | 8/2012 | Santoro | B01F 5/0473 210/665 |
| 2014/0375084 A1* | 12/2014 | Le Roy | B62D 25/081 296/192 |

(Continued)

FOREIGN PATENT DOCUMENTS

| | | |
|---|---|---|
| BE | 1013204 A6 | 10/2001 |
| DE | 19919048 A1 | 11/2000 |

(Continued)

OTHER PUBLICATIONS

English Machine Translation of BE1013204A6.

(Continued)

*Primary Examiner* — Eric W Golightly
(74) *Attorney, Agent, or Firm* — Jason Rogers; King & Schickli, PLLC

(57) ABSTRACT

A wiper assembly for a window of a vehicle and a method of cleaning a window are provided. The wiper assembly includes a wiper blade having a fluid extraction opening, a fluid discharge outlet remote from the wiper blade and a fluid tight conduit connecting the fluid extraction opening to the fluid discharge outlet. The wiper assembly may further include a suction pump configured to draw air and water into the fluid extraction opening and through the fluid tight conduit of the wiper assembly, thereby reducing the amount of water left of the window following wiping and improving visibility for the driver.

9 Claims, 3 Drawing Sheets

(56) References Cited

U.S. PATENT DOCUMENTS

2015/0019075 A1* 1/2015 Melcher ................ B60S 1/0818
701/36

FOREIGN PATENT DOCUMENTS

| EP | 2626257 | A2 | 8/2013 |
| EP | 2626257 | A3 | 10/2013 |
| FR | 2373426 | A1 | 7/1978 |
| FR | 2888551 | A1 | 1/2007 |

OTHER PUBLICATIONS

English Machine Translation of DE19919048A1.
English Machine Translation of FR2373426A1.
English Machine Translation of FR2888551A1.

* cited by examiner

ENHANCED WIPER ASSEMBLY

TECHNICAL FIELD

The present disclosure relates to a wiper assembly for a vehicle.

BACKGROUND

Windscreen wipers are essential components of a vehicle for ensuring the driver has unimpaired vision in all conditions. Windscreen wipers typically comprise rigid arms which sweep back and forth across the windscreen or tailgate glass. The rigid arms are typically configured to support wiper blades which comprise a rubber wiper portion held in contact with the glass of the windscreen or tailgate as the wiper arm sweeps across.

In wet conditions, wiper blades scrape any water which has settled on the windscreen or tailgate glass to the edge of the glass where it can drain away and does not obstruct the vision of the driver.

In dry weather, windscreen wipers allow the windscreen to be cleaned of dirt and grease by firstly spraying water or a cleaning solution onto the windscreen or tailgate glass, then operating the wipers to wipe away the water together with any dirt and grease which has become suspended in the water.

Even the best conventional wiper blades leave droplets of water on the windscreen or tailgate glass when operating. This may be particularly apparent when the windscreen or tailgate glass is especially dirty or greasy. Over time the performance of the wiper blades deteriorates, as the material of the blade is degraded by dirt, oil, sunlight, ozone and airborne contaminants. If the material of the blade has deteriorated, the blade may not maintain contact with the glass across the full length of the blade during its full traverse over the windscreen or tailgate glass and hence the performance of the system may be reduced. The amount of water, dirt and grime which is left on the windscreen may gradually become more noticeable to the driver, and may begin to impair the driver's vision.

SUMMARY

According to an aspect of the present disclosure there is provided a wiper assembly for a window of a vehicle, such as a motor vehicle, the assembly comprising: a wiper blade having a fluid extraction opening; and a suction pump, configured to draw air and water through the fluid extraction opening of the wiper blade away from the window of the vehicle. This arrangement reduces the amount of water left on the window following wiping, and improves visibility for a driver of the vehicle.

The term 'window of a vehicle' in this specification is intended to encompass any surface of a vehicle and in particular a windscreen, rear screen, tailgate window, side windows, sun roof, mirrors, light lenses or any transparent, translucent or reflective surface of the vehicle.

The term 'suction pump' in this specification is intended to encompass a simple venturi, a venturi pump or any other form of pump such as a piston, rotary or peristaltic pump.

The wiper assembly may further comprise a fluid tight conduit connecting the fluid extraction channel to a fluid discharge outlet, the fluid discharge outlet being remote from the wiper blade.

According to an aspect of the present disclosure, there is provided a wiper assembly for a window of a vehicle, such as a motor vehicle, the assembly comprising: a wiper blade having a fluid extraction opening; a fluid discharge outlet remote from the wiper blade; and a fluid tight conduit connecting the fluid extraction opening to the fluid discharge outlet.

The fluid extraction opening may comprise an elongate slot extending along a length of the wiper blade, e.g. partially or fully along the full length of the wiper blade. The wiper assembly may further comprise one or more additional extraction openings.

The wiper blade may comprise one or more internal channels in fluidic communication with the extraction opening or openings. The internal channels may be configured to connect the extraction opening to the fluid tight conduit. Each of the one or more internal channels may be in fluidic communication with a different one of the extraction openings or a different subset of the extraction openings to the others of the one or more channels.

The wiper blade may comprise a leading surface and a trailing surface. The leading and/or trailing surface of the wiper blade may comprise one or more serrations. At least one of the one or more serrations may be substantially aligned with the fluid extraction opening.

The wiper assembly may further comprise a water/air separator provided upstream of the fluid discharge outlet.

The wiper assembly may further comprise a pump configured to draw air and water into the fluid extraction opening and through the fluid tight conduit of the wiper assembly, thereby reducing the amount of water left of the window following wiping and improving visibility for a driver of the vehicle. The suction pump may be powered by a supply of ram air provided on the vehicle. The fluid tight conduit may comprise a flexible tube.

The wiper assembly may further comprise a water sensor, and/or a dirt sensor configured to measure the amount of water and/or dirt present on the surface being wiped.

According to another aspect of the present disclosure, there is provided a method for removing water from a window of a vehicle, the method comprising: providing a wiper blade including a fluid extraction opening; and a suction pump; and operating the suction pump to draw air and water through the fluid extraction opening of the wiper blade away from the window of the vehicle.

According to another aspect of the present disclosure, there is provided a method for removing water from a window of a vehicle, the method comprising: providing a wiper blade including a fluid extraction opening; and a fluid discharge outlet remote from the wiper blade; and connecting the fluid extraction opening to the fluid discharge outlet with a fluid tight conduit.

The method may further comprise: providing a pump configured to draw air and water through the fluid extraction opening of the wiper blade.

The method may further comprise: coordinating the operation of the suction pump with the operation of an actuation unit configured to control the motion of the wiper blade.

The method may further comprise monitoring the presence of water and/or dirt on the vehicle window, and adjusting the operation of the suction pump accordingly. For example by increasing the amount of time that the suction pump operates, if the amount of water and/or dirt present increases.

According to another aspect of the present disclosure, there is provided a controller configured to perform the method according to any of the previously mentioned aspects of the disclosure.

According to another aspect of the present disclosure, there is provided software, which when executed by a computing apparatus causes the computing apparatus to perform the method according to any of the previously mentioned aspect of the disclosure.

According to another aspect of the present disclosure, there is provided a vehicle comprising the wiper assembly according to any of the previously mentioned aspects of the disclosure.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

DESCRIPTION OF THE DRAWING FIGURES

For a better understanding of the present disclosure, and to show more clearly how it may be carried into effect, reference will now be made, by way of example, to the accompanying drawings, in which.

DETAILED DESCRIPTION

Figure 1:
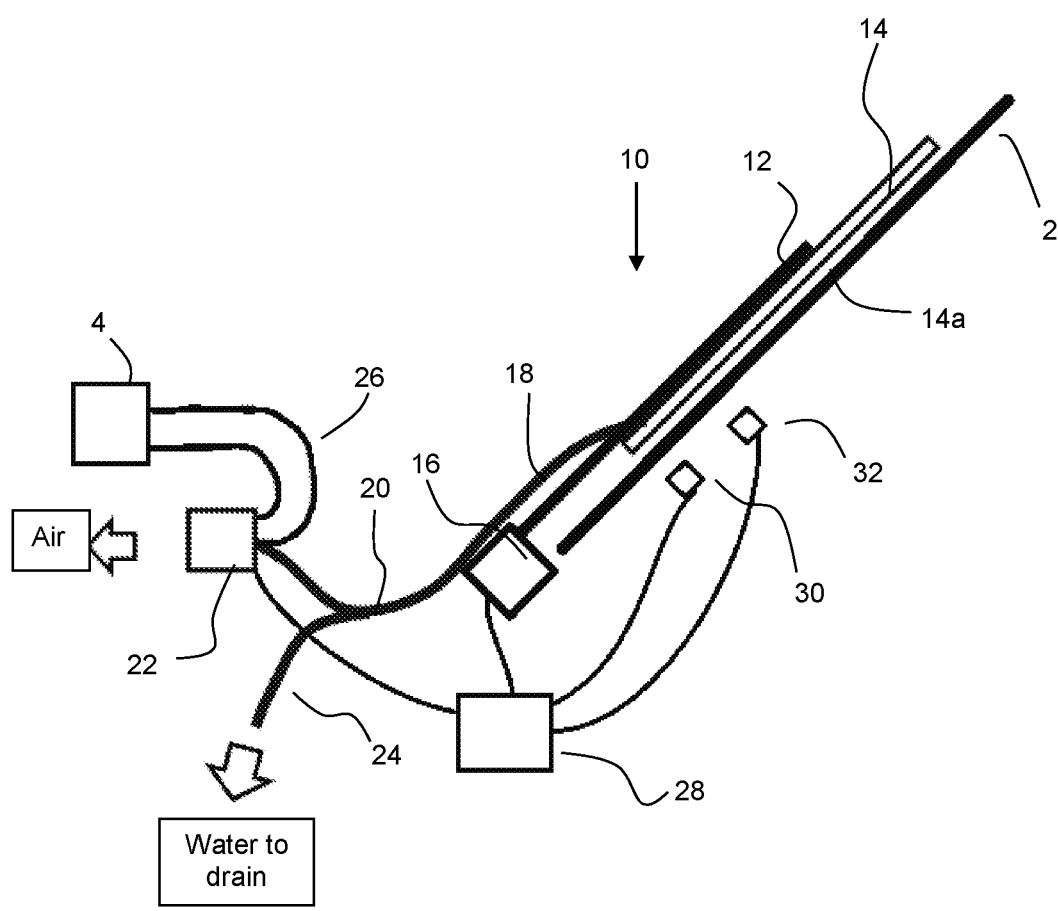
FIG. 1 is a schematic sectional view of a vehicle wiper assembly according to an example of the present disclosure.

A vehicle, such as a motor vehicle, may comprise a windscreen 2 and a windscreen wiper assembly 10. With reference to FIG. 1, the vehicle wiper assembly 10, according to an example of the present disclosure, comprises a wiper arm 12 and a wiper blade 14. The wiper arm 12 is configured to couple to the wiper blade 14 at a first end of the wiper arm.

Figure 2:
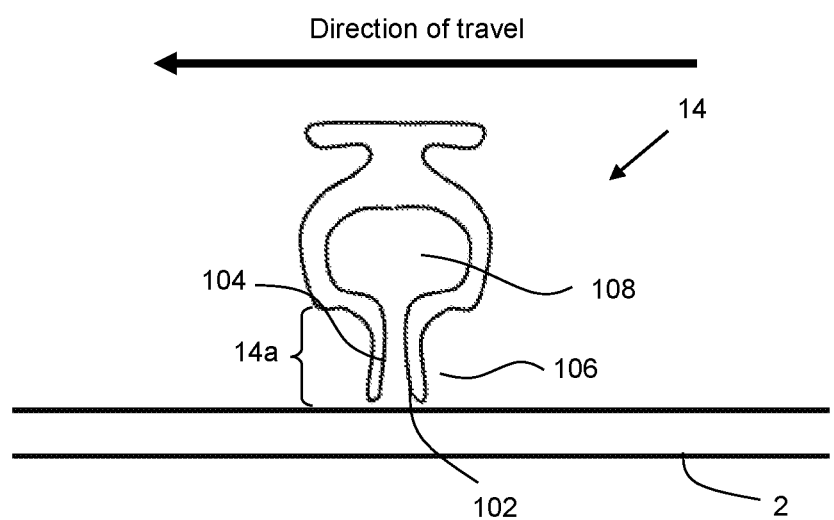
FIG. 2 is a schematic sectional view of a wiper blade for a wiper assembly of a vehicle according to an example of the present disclosure.

As illustrated in FIG. 2, the wiper blade 14 comprises a flexible wiper portion 14a. The wiper arm 12 and wiper blade 14 are together configured such that the wiper portion 14a maintains contact with the windscreen 2, as the wiper blade is passed across the windscreen 2.

In order to maintain contact between the wiper blade 14 and the windscreen 2, the wiper blade 14 may be pivotally connected to the wiper arm 12, and the wiper arm 12 may include a resilient element such as a spring (not show) which acts to hold the wiper arm 12 and the wiper blade 14 against the windscreen. The wiper blade 14 itself may be resilient or may comprise one or more resilient elements (not shown) which act to curve the wiper portion 14a of the wiper blade 14 in order to adapt it to the shape of the windscreen 2, and thereby maintain contact between the wiper portion 14a and the windscreen 2 across the full length of the wiper blade.

The wiper assembly 10 of FIG. 1 further comprises a wiper motor and actuator assembly 16, which is coupled to a second end of the wiper arm 12. The wiper motor and actuator assembly 16 is operable to control the movement of the wiper arm 12 to sweep the wiper blade 14 across the windscreen 2.

As the wiper blade 14 is moved across the windscreen 2, the wiper portion 14a scrapes across the surface of the windscreen sweeping any water or dirt present on the windscreen toward the sides of the windscreen. Additionally, water may collect on the wiper portion 14a as it moves across the windscreen 2 and may run down the wiper blade 14 to the bottom of the windscreen. In this way the wiper assembly 10 acts to maintain good visibility for a driver of the vehicle.

The driver may operate the windscreen wipers during bad weather for the removal of precipitation such as rain water from the windscreen 2. The driver may also use the windscreen wipers together with a windscreen washer (not shown) which introduces water or a cleaning solution onto the windscreen, allowing dirt to be loosened by the windscreen wipers and carried away with the water.

As the wiper blade 14 moves across the windscreen 2, some of the water which has settled on the windscreen 2 may not be collected by the wiper blade 14. The wiper blade 14 may sweep over the water without it being scraped to the side of the windscreen 2. This may be especially likely if the windscreen 2 is dirty or greasy, or if the material of the windscreen wiper blade 14 has begun to deteriorate. If the windscreen wipers are affected by this, water droplets and dirt may remain on the surface of the windscreen 2 and the vision of the driver may be impaired.

Even when the wiper blades 14 are operating with optimal performance, it is still possible that some small water droplets will be left on the windscreen 2.

With reference to FIG. 2, the wiper blade 14, according to an example of the present disclosure, is provided with one or more extraction openings 102. The one or more openings 102 are provided on the wiper portion 14a of the wiper blade 14.

On the wiper blade depicted in FIG. 2, the one or more openings 102 comprise a single elongated slot which extends substantially along the full length of the wiper blade 14. However, it is equally envisaged that the openings 102 could comprise a plurality of discrete openings along part or all of the length of the wiper blade 14.

In FIG. 2, the opening 102 is depicted on the edge of the wiper blade 14 which is in contact with the windscreen 2 and the opening is located between a leading surface 104 and a trailing surface 106 of the wiper portion 14a. Additionally or alternatively, the opening 102 may be provided on the leading surface 104 of the wiper blade 14. Again, additionally or alternatively the opening 102 may be provided on the trailing surface 106 of the wiper blade 14. The opening 102 may be positioned such that it is closest to any water on the windscreen 2 which has not been collected by the wiper blade as it sweeps across the windscreen.

One or more internal channels 108 are provided within the wiper blade 14. The opening 102 extends into the wiper blade 14 to meet the one or more channels 108. The opening 102 is thereby in fluidic communication with the one or more channels 108.

In the example shown in FIG. 2, the one or more channels 108 comprise a single channel with a substantially circular cross section which extends along the full length of the wiper blade 14. It is equally envisaged that the channel 108 may comprise a plurality of channels, and each of the channels may be connected in fluidic communication with a different subset of the openings 102. For example, the one or more channels 108 could comprise two channels, the first of which is connected to a subset of openings 102 provided on the leading surface 104 of the wiper blade 14 and the second of which is connected to a subset of the openings 102 provided on the trailing surface 106 of the wiper blade. Alternatively, the channels 108 may extend different lengths along the wiper blade 14 and may connect to different subsets of the openings 102 separated along the length of the wiper blade 14. Alternative configurations are also contemplated.

Figure 3:
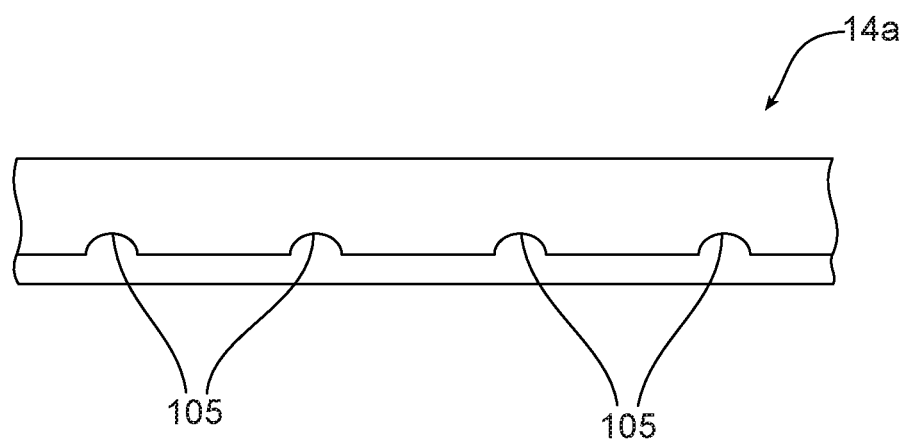
FIG. 3 is a detailed elevational view showing an embodiment of the vehicle wiper assembly including serrations at spaced locations of the wiper portion.

In another example illustrated in FIG. 3, the leading surface 104, and/or trailing surface 106 may be discontinuous or comprise one or more recesses, crenulations or serrations 105, such that the leading and/or trailing surface does not contact the surface of the windscreen 2 continuously along its length. The serrations 105 may comprise triangular shaped cut outs from the leading and/or trailing surface of the wiper portion 14a. Alternatively the cut outs may be circular, semi-circular, square or any other shape. The serrations 105 may improve the flow of air, water, dirt and/or grease past the leading and/or trailing surfaces of the wiper portion 14a and may increase the amount of air, water, dirt and/or grease drawn through the one or more openings 102 and the one or more channels 108. The serrations 105 may be substantially aligned with the one or more openings 102.

With reference to FIG. 1, the vehicle wiper assembly 10 further comprises a conduit 18. The conduit 18 is coupled to the wiper blade 14 and is in fluidic communication with at least one of the one or more channels 108 at a first end of the conduit 18. In the example shown in FIG. 1 the conduit 18 comprises a flexible tube, however the conduit 18 may alternatively comprise a rigid tube or pipe, or may comprise a bore formed through a body of the vehicle wiper assembly 10.

The conduit 18 is connected, at a second end, to a suction pump 22. The suction pump 22 is configured to pump air through the conduit 18, thereby pumping air through the openings 102 and through the channels 18 within the wiper blade 14.

The suction pump 22 may comprise a mechanically or electrically driven suction pump. Alternatively, the suction pump 22 may comprise any other suitable pump. In the example shown in FIG. 1, the suction pump 22 comprises a ram air powered pump which is driven by a ram air source 4 provided on the vehicle, such as a ram air induction system (not shown), which may for example provide combustion air to an internal combustion engine of the vehicle. Ram air may be provided to the suction pump 22 via a ram air duct 26.

As described previously, during use of the windscreen wiper, it is likely that water will be present on the windscreen, at or around the openings 102. Water is therefore entrained in the flow of air being pumped into the openings 102. Any dirt or grease suspended in the water is also drawn in through the openings 102.

The action of drawing water and dirt and/or grease into the openings 102 during operation of the wiper system 10 reduces the amount of water and/or dirt and/or grease which remains on the windscreen following an operation of the wiper assembly 10. The quality of vision that the driver has through the windscreen 2 is therefore improved relative to what it would have been with a conventional vehicle wiper assembly.

A water separator 20 may be provided within the vehicle wiper assembly 10. In the illustrated example, the water separator 20 is provided on the conduit 18 between its first and second ends, such that water and any suspended dirt and/or grease, which has been entrained in the flow of air through the conduit 18, can be separated from the flow before it reaches the suction pump 22.

A drain pipe 24 is provided in the wiper assembly 10 which carries any separated water away from the water separator 20 to a fluid discharge outlet provided at a suitable drain point on the vehicle.

Although in the arrangement shown in FIG. 1, the water separator 20 is provided on the conduit 18 upstream of the suction pump 22, it is equally envisaged that the water separator may be provided downstream of the suction pump 22 and the suction pump may be configured to pump the mixture of air and water, dirt and/or grease. Alternatively, the suction pump 22 may comprise the separator 20.

The wiper assembly 10 may further comprise a controller 28. The controller 28 may comprise one or more modules. In the illustrated example, the controller 28 is operatively connected to the wiper motor and actuator assembly 16 and the suction pump 22. In use, the controller 28 or one or more modules of the controller coordinate the operation of the wiper motor and actuator assembly 16 and the suction pump 22 such that the suction pump 22 operates only during a period when water is likely to be present at or around the openings 102, for example whilst the wiper blade 14 is being swept across the windscreen 2.

The wiper assembly 10 may further comprise a water sensor 30 and/or a dirt sensor 32. In the illustrated example, the water sensor 30 and the dirt sensor 32 are operatively connected to the controller 28. The controller 28 or one or more modules of the controller 28 may consider sensor readings from the water sensor 30 and/or the dirt sensor 32 when determining how to coordinate the operation of the wiper motor and actuator assembly 16 and the suction pump 22. For example, if a high level of water is detected, the controller 28 or one or more modules of the controller may extend the duration over which the suction pump 22 is operating.

Although the wiper assembly 10 has been described with reference to a vehicle windscreen 2, it is equally envisaged that it could be applied to a tailgate window, headlight lens, wing mirror, or any other surface of a vehicle from which it is desirable to remove water and/or dirt and/or grease.

It will be appreciated by those skilled in the art that although the wiper assembly 10 has been described by way of example, with reference to one or more exemplary examples, it is not limited to the disclosed examples and that alternative examples could be constructed without departing from the scope of the wiper assembly as defined by the appended claims.

The invention claimed is:

1. A wiper assembly for a window of a vehicle, the assembly comprising:
    a wiper blade having a fluid extraction opening, wherein the fluid extraction opening comprises an elongate slot extending along a length of the wiper blade;
    a fluid discharge outlet remote from the wiper blade;
    a fluid tight conduit connecting the fluid extraction opening to the fluid discharge outlet, the fluid tight conduit configured to carry water away from the fluid extraction opening, thereby reducing the amount of water left on the window following wiping and improving visibility for a driver of the vehicle;
    a suction pump configured to draw air and water into the fluid extraction opening and through the fluid tight conduit of the wiper assembly; and
    one or more additional extraction openings,
    wherein the wiper blade includes one or more internal channels in fluidic communication with the fluid extraction opening and configured to connect the fluid extraction opening to the fluid tight conduit and, wherein each of the one or more internal channels is in fluidic communication with a different one of the one or more additional extraction openings or a different subset of the extraction openings to the others of the one or more channels.

2. The wiper assembly of claim 1, wherein the suction pump is powered by a supply of ram air provided on the vehicle.

3. The wiper assembly of claim 2, wherein the fluid tight conduit comprises a flexible tube.

4. The wiper assembly of claim 3, wherein the wiper blade comprises a leading surface and a trailing surface.

5. The wiper assembly of claim 4, wherein the leading and/or trailing surface of the wiper blade comprises one or more serrations.

6. The wiper assembly of claim 5, wherein at least one of the one or more serrations is substantially aligned with the fluid extraction opening.

7. The wiper assembly of claim 1, further comprising a water sensor, and/or a dirt sensor configured to measure the amount of water and/or dirt present on the surface being wiped.

8. The wiper assembly of claim 1, wherein the wiper assembly further comprises a control module configured to coordinate the operation of the suction pump with the operation of an actuation unit, the actuation unit configured to control the motion of the wiper blade.

9. The wiper assembly of claim 8, wherein the wiper assembly further comprises a second control module configured to monitor the presence of water and/or dirt on the vehicle window, and adjust the operation of the suction pump accordingly.

* * * * *